(12) United States Patent
Pal et al.

(10) Patent No.: US 11,092,466 B2
(45) Date of Patent: *Aug. 17, 2021

(54) INTERNET OF THINGS BASED CONVEYANCE HAVING PREDICTIVE MAINTENANCE

(71) Applicant: MachineSense, LLC, Baltimore, MD (US)

(72) Inventors: Biplab Pal, Ellicott City, MD (US); Amit Purohit, Thane West (IN)

(73) Assignee: MachineSense, LLC, Baltimore, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/826,764

(22) Filed: Mar. 23, 2020

(65) Prior Publication Data

US 2020/0355524 A1 Nov. 12, 2020

Related U.S. Application Data (63) Continuation of application No. 16/253,925, filed on Jan. 22, 2019, now Pat. No. 10,598,520, which is a (Continued)

(51) Int. Cl.
*G01D 7/00* (2006.01)
*G16Y 40/40* (2020.01)
(Continued)

(52) U.S. Cl.
CPC .......... *G01D 7/005* (2013.01); *B23Q 17/0971* (2013.01); *B65G 53/66* (2013.01); (Continued)

(58) Field of Classification Search
CPC .... G01D 7/005; G16Y 40/40; G06F 11/0709; B23Q 17/0971; G05B 19/0428; G05B 19/4184; B65G 53/66
See application file for complete search history.

(56) References Cited

U.S. PATENT DOCUMENTS

| 4,023,940 A | 5/1977 | Shultz |
| 4,131,011 A | 12/1978 | Ling |

(Continued)

FOREIGN PATENT DOCUMENTS

| CN | 201672991 | 12/2010 |
| CN | 102539911 A | 7/2012 |

(Continued)

OTHER PUBLICATIONS

International Search Report and Written Opinion for PCT Application No. PCT/US16/18820; dated Aug. 4, 2016.
(Continued)

*Primary Examiner* — Yasser A Abdelaziez
(74) *Attorney, Agent, or Firm* — Fox Rothschild LLP (57) ABSTRACT

A method and system of a predictive maintenance IoT system comprises receiving a plurality of sensor data over a communications network and determining one or more clusters from the sensor data based on a pre-determined rule set. Further, the sensor data is classified through a machine learning engine and the sensor data is further base-lined through a combination of database architecture, data training architecture, and a base-lining algorithm. Intensity or degree of fault state is mapped to a fuel gauge to be depicted on a user interface and a predictive maintenance state is predicted through a regression model and appropriate alarm is raised for user action.

20 Claims, 5 Drawing Sheets

Related U.S. Application Data continuation of application No. 14/790,084, filed on Jul. 2, 2015, now abandoned, which is a continuation-in-part of application No. 14/696,402, filed on Apr. 25, 2015, now Pat. No. 10,599,982, which is a continuation-in-part of application No. 14/628,322, filed on Feb. 23, 2015, now abandoned.

(51) Int. Cl.
| | | |
|---|---|---|
| B23Q 17/09 | (2006.01) | |
| B65G 53/66 | (2006.01) | |
| G05B 19/042 | (2006.01) | |
| G05B 19/418 | (2006.01) | |
| G06F 11/07 | (2006.01) | |

(52) U.S. Cl.
CPC ..... *G05B 19/0428* (2013.01); *G05B 19/4184* (2013.01); *G06F 11/0709* (2013.01); *G16Y 40/40* (2020.01)

(56) References Cited

U.S. PATENT DOCUMENTS

| | | |
|---|---|---|
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |
| 6,289,606 B2 | 9/2001 | Gillette et al. |
| 6,330,525 B1 | 12/2001 | Hays |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 * | 12/2014 | Woolever ............... B65G 53/66 406/14 |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 * | 9/2004 | Edie .................. B23Q 17/0971 702/179 |
| 2004/0199573 A1 | 10/2004 | Schwarz et al. |
| 2005/0049834 A1 | 3/2005 | Bottomfield |
| 2005/0222794 A1 | 10/2005 | Baird et al. |
| 2006/0137105 A1 | 6/2006 | Hong et al. |
| 2006/0168195 A1 * | 7/2006 | Maturana ............ G06F 11/0709 709/224 |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2008/0294382 A1 | 11/2008 | Lim |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 * | 5/2013 | Driussi .................. D06F 33/00 219/507 |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 * | 5/2014 | Lill .................. G05B 19/0428 340/679 |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1 * | 9/2015 | Blevins .............. G05B 19/4184 700/17 |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | |
|---|---|---|
| CN | 103399486 A | 11/2013 |
| CN | 203362223 U | 12/2013 |

(56) References Cited

FOREIGN PATENT DOCUMENTS

| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

International Search Report and Written Opinion for PCT Application No. PCT/US15/066547; dated Mar. 17, 2016.
Sensors Drive Mobile IoT; Wong, William; Jan. 26, 2015; Electronic Design.
International Search Report and Written Opinion for PCT Application No. PCT/US16/028724; dated Aug. 22, 2016.
International Search Report and Written Opinion for PCT Application No. PCT/US16/18831; dated Aug. 12, 2016.
Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and Som by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/13978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.orq/document/8089336/ Future Edge Cloud and Edge Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.
Dec. 21, 2018 Non-Final Office Action against Applicant's co-pending U.S. Appl. No. 14/833,111.
Vasudevan, Shobha, "Still a Fight to Get It Right: Verification in the Era of Machine Learning", 2017 IEEE International Conference on Rebooting Computing (ICRC), Washington, DC, 2017, pp. 1-8. (Year: 2017).

* cited by examiner

INTERNET OF THINGS BASED CONVEYANCE HAVING PREDICTIVE MAINTENANCE

CROSS-REFERENCE TO RELATED PATENT APPLICATIONS

This patent application is a 35 USC 120 continuation of U.S. patent application Ser. No. 16/253,925 filed 22 Jan. 2019, naming as inventors Biplab Pal and Amit Purohit by applicant MachineSense, LLC. The '925 application was published as United States patent publication 2019-0154469 A1 on 23 May 2019.

The '925 application was a 35 USC 120 continuation of U.S. patent application Ser. No. 14/790,084 filed 2 Jul. 2015, naming as inventors Biplab Pal and Amit Purohit by applicant Prophesy Sensors, LLC, the name of which has been changed to MachineSense LLC, a Maryland corporation located in Baltimore, Md. The '084 application was published as United States patent publication 2016/0313216 on 27 Oct. 2016, now abandoned.

The '084 application was a 35 USC 120 continuation-in-part of U.S. patent application Ser. No. 14/696,402 filed Apr. 25, 2015, entitled "Internet Of Things Based Determination Of Machine Reliability And Automated Maintenance, Repair And Operation (MRO) Logs".

The '402 application was a 35 USC 120 continuation-in-part of U.S. patent application Ser. No. 14/628,322 filed Feb. 23, 2015, entitled "Real Time Machine Learning Based Predictive and Preventive Maintenance of Vacuum Pump", now abandoned.

Applicant claims the benefit of the '084, '402, and '322 applications under 35 USC 120.

The disclosures of all the foregoing patent applications are hereby incorporated by reference.

FIELD OF TECHNOLOGY

The present invention generally relates to the Internet of Things (IoT), and more particularly relates to predictive maintenance through an IoT system based classification for a pneumatic conveying system.

BACKGROUND

The Internet of Things (IoT) is a network of uniquely-identifiable, purposed "things" that are enabled to communicate data, pertaining to the things, between the things, over a communications network whereby the communicated data forms a basis for manipulating operation of the "things". The "thing" in the "Internet of Things" could virtually be anything that fills a common purpose or use. For example, a "thing" could be a person with a heart rate monitor implant, a farm animal with a biochip transponder, an automobile that has built-in sensors to alert its driver when tire pressure is low, or the like, or any other natural or man-made entity that can be assigned a unique IP address and provided with the ability to transfer data over a communication network. Notably, if all the entities in an IoT are machines, then the IoT is referred to as a "Machine to Machine" (M2M) IoT or simply, as M2M IoT.

It is apparent from the aforementioned examples that an entity becomes a "thing" of an M2M IoT, when the entity has attached one or more sensors capable of (1) capturing one or more types of data pertaining thereto; (2) segregating the data (if applicable); (3) selectively communicating each segregation of data to one or more fellow "things"; (4) receiving one or more control commands (or instructions) from one or more fellow "things", the one or more control commands is based on the data received by the one or more fellow "things"; and (5) executing one or more commands resulting in the manipulation or "management" of the operation of the corresponding entity. Therefore, in an IoT-enabled system, the "things" basically manage themselves without any human intervention, thus drastically improving the efficiency thereof.

U.S. Patent publication 2014/0336791 A1 discusses a predictive maintenance of industrial systems using big data analysis in a cloud platform.

U.S. Pat. No. 8,560,368 B1 discusses constraint-based scheduling, and in particular, constraint-based scheduling of one or more components for maintenance based on both, time-based maintenance information and condition-based maintenance information.

U.S. Pat. No. 6,405,108 B1 discusses a system and process for developing diagnostic algorithms for predicting impending failures of the subsystems in a locomotive.

WIPO application WO2005086760 A2 discusses a method and system for monitoring and maintaining equipment and machinery, as well as any other device or system that has discrete measuring points that can be gathered and analyzed to determine the status of the device or the system.

Visualization of analytical results or processed data from a big data system poses several new challenges in terms of scalability, volume and velocity. The results must be interpreted to the users, who are technicians and not familiar with many of the advanced sensor data analytics. Therefore visualization of the predictive maintenance results must be auto-interpreted to factory technicians using a simple, normalized gauge scale concept. None of the prior art technologies emphasize the visualization of the processed analytic data of predictive maintenance when obtained as a result of complex machine learning calculation.

However, existing prior art technologies are limited to rule based engines. Mere rule based engines do not provide effective visualization of the equipment monitoring data which is critical for operational deployment of predictive maintenance systems. Further, mere rule based engines may not be sufficient to help operators in handling multiple organ failure in machines. Further, the above prior art technologies does not allow scalability in order to handle large volumes of data and therefore not capable of providing the solution for an IoT based predictive maintenance system.

It is evident from the discussion of the aforementioned prior publications that none of the aforementioned prior art paves the way for predictive maintenance of a machine through an IoT system based classification and providing effective visualization to a machine operator. Therefore, there exists a need in the art for a solution to the aforementioned problem.

SUMMARY OF THE INVENTION

Disclosed are a method, an apparatus and/or a system of predictive maintenance through an IoT system based classification.

A method of predictive maintenance through an IoT system comprises receiving a plurality of sensor data over a communications network and determining one or more clusters from the sensor data based on a pre-determined rule set. Further, the sensor data is classified through a machine learning engine and the sensor data is further base-lined through a combination of database architecture, data training architecture, and a base-lining algorithm. A predictive maintenance state is predicted through a regression model and the predictive maintenance state is mapped onto a depiction on a user interface.

A predictive maintenance based IoT system comprises: a mobile middleware to receive a plurality of sensor data over a communications network; a clustering module to determine one or more clusters from the sensor data based on a pre-determined rule set; a computer database to store the pre-determined rule set; a machine learning engine to classify the sensor data; and a base-lining architecture to base-line the sensor data. The base-lining architecture is a combination of database architecture, data training architecture and a base-lining algorithm. Further, the system also includes a regression module associated with a processor to predict a predictive maintenance state. The predictive maintenance state is mapped onto a depiction on a user interface.

The methods and systems disclosed herein may be implemented in any means for achieving various aspects of intended results, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of the present invention are illustrated by way of example and not as limitation in the accompanying drawings, in which like references indicate similar elements and in which.

Other features of the present embodiments will be apparent from the accompanying drawings and from the detailed description that follows.

DETAILED DESCRIPTION OF THE INVENTION

Example embodiments, as described below, may be used to provide a method, an apparatus and/or a system for predictive maintenance through an IoT system based classification. Although the present embodiments have been described with reference to specific example embodiments, it will be evident that various modifications and changes may be made to these embodiments without departing from the broader spirit and scope of the various embodiments.

One of the key emerging issues in IoT based systems is the visualization of analytical results that have been obtained in real time and/or near real time by processing data from multiple-sensors. For a long time, sensor based systems remained fairly simple consisting of only one kind of sensors. The one kind of sensor indicated either a failure and/or a triggering event. The IoT systems of the past were merely rule based alarms. Rules may consist of a value higher and/or lower than a pre-assigned value. With emerging IoT technologies, priority may be to extract useful intelligence and/or meaningful information from data collected from thousands of sensors of different kinds. Today, big data analytics may allow for processing large data volumes at high speeds. Therefore, a more complex alarm system may be designed wherein an alarm threshold is not a simple sensor value but a complex hyperplane constructed from a cluster of different kinds of sensor values from different types of sensors (Ex: sensors with different physical parameters such as temperature, pressure, vibration, power factor etc.). Besides, sensor cluster data may consist of several sensors, one single cluster may contain multiple alarm information as multiple hyper-planes can be constructed for different kinds of alarms and/or relevant information related to classification of such cluster data.

However, one of the most prevailing issues of multi-classification analytics is the effective visualization of the processed result and/or alarm system in the specific case of IoT. In a layered approach to sensor data analytics, classification results may be mapped into a simple "Fuel Gauge" with a normalized scale of 0-100, wherein a user can set a scale for setting up their alarm and scaling up their predictive maintenance issue on the field. Thus, complex results of Big Data IoT analytic may be visualized in the most simplest and familiar form by applying the techniques disclosed herein.

In an example embodiment, pneumatic conveying system consists of vacuum pump, vacuum receiver, pickup device and tubings. Vacuum pump may be the most critical equipment of the vacuum conveying system.

In one or more embodiments, equipment may need to be maintained at optimum condition to achieve efficient and smooth performance. The equipment may undergo different failure modes resulting in different types of faults. The type of fault information may be critical for choosing maintenance actions for the equipment. It is not possible to choose a maintenance action without a knowledge of the fault type. On the other hand, incorrect fault type information may lead to wasted maintenance effort and subsequent equipment failure with safety and economic implications. A Multi-fault classification technique may identify the fault type of the equipment from an equipment operating data.

In an example embodiment, a vacuum conveying pump may develop fault in different sub-components such as filter, oil, belt blower, etc. More often different failure modes manifest in the form of similar operator observation such as, deterioration in oil quality and higher oil level resulting in increased vibration level for the vacuum conveying pump. Therefore, it is very important to detect the fault type correctly to plan the maintenance actions and avoid safety related incidents and economic losses.

Figure 1:
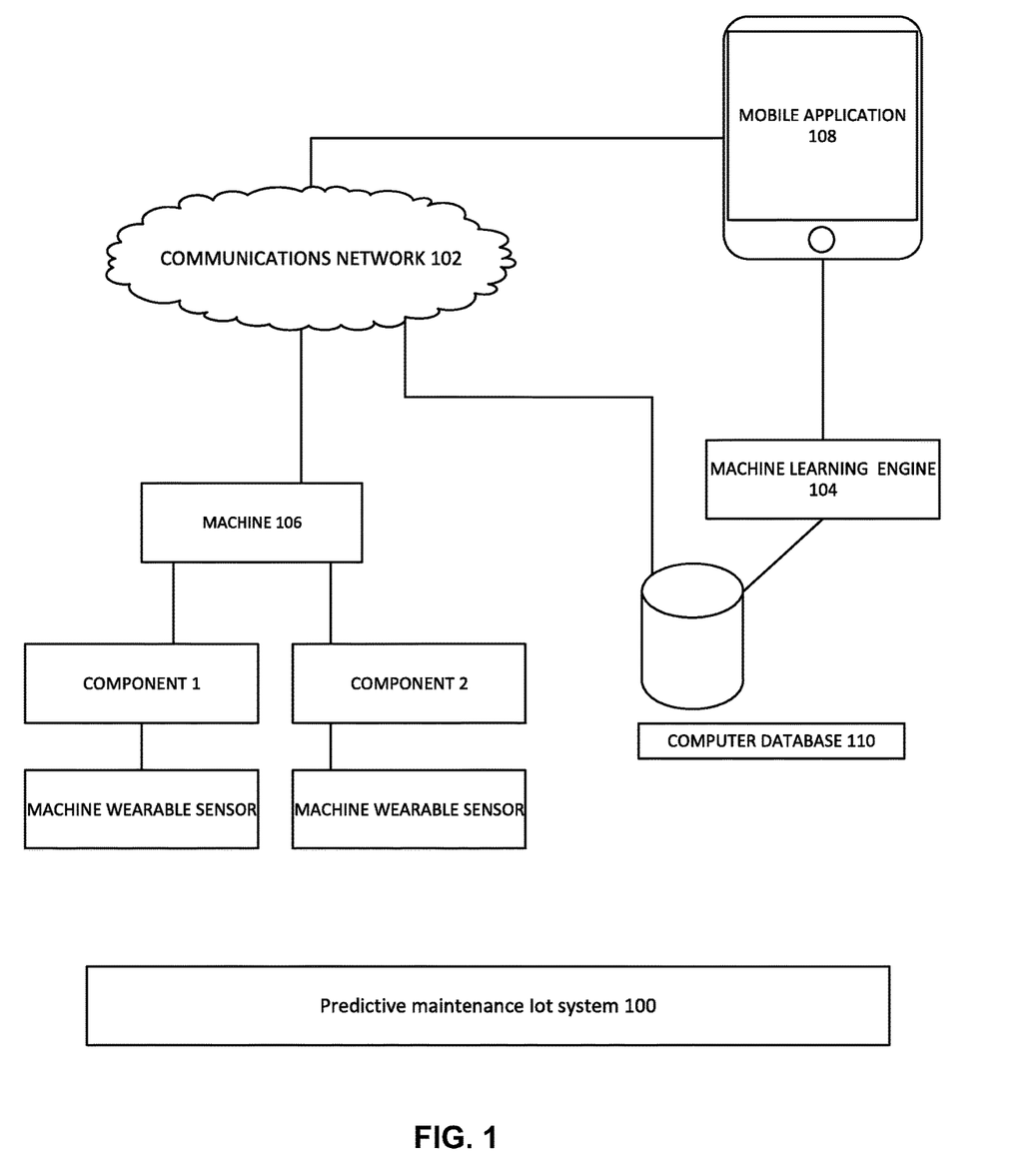
FIG. 1 is a diagrammatic representation of a predictive maintenance IOT system, according to one or more embodiments.

FIG. 1 is a system diagram of a predictive maintenance IoT system, according to one or more embodiments. The predictive maintenance IoT system 100 includes a machine 106, machine learning engine 104, computer database 110, communications network 102, and a mobile application 108.

In one or more embodiments, the predictive maintenance IoT system 100 may comprise a mobile middleware 108 to receive a plurality of sensor data from one or more machines such as machine 106 over a communications network 102. Each machine 106 may be associated with a component and each component may be associated with a machine wearable sensor. A clustering module may determine one or more clusters from the sensor data based on a pre-determined rule set stored in a computer database 110. A machine learning engine 104 may classify the sensor data. Further, a baselining architecture may base-line the classified sensor data. The baselining architecture may be a combination of database architecture, data training architecture, and a baselining algorithm. Further, the system may also include a regression module associated with a computer processor to predict a predictive maintenance state. The predictive maintenance state is mapped onto a depiction on a user interface.

In an example embodiment, the predictive maintenance state mapped onto a depiction on a user interface may be associated with a mobile device running a mobile application 108.

In an example embodiment, the sensor data may be determined from a machine wearable sensor placed on a motor, a machine wearable sensor placed on the blower and so on.

In one or more embodiments, the communications network 102 may be one of a WiFi, 20, 30, 40, GPRS, EDGE, Bluetooth, ZigBee, Piconet of BLE, Zwave, or a combination thereof.

In one or more embodiments, the machine learning engine 104 may be associated with a machine learning algorithm. The machine learning engine may be associated with one or more of one of a physics based model, a rule based model and a vector classifier model.

In one or more embodiments, a physics based model may include extracting physical parameters from sensor data such as total energy of vibration, multiple axes (X, Y, Z axis) of vibration, azimuthal and polar angle of vibration rotation, RMS (Root Mean Square) value of vibration, shape factor of vibration and the like.

In one or more embodiments, the data training architecture receives as input, one or more of a baseline reading and an anomalous reading from a component associated with a sensor.

Figure 4:
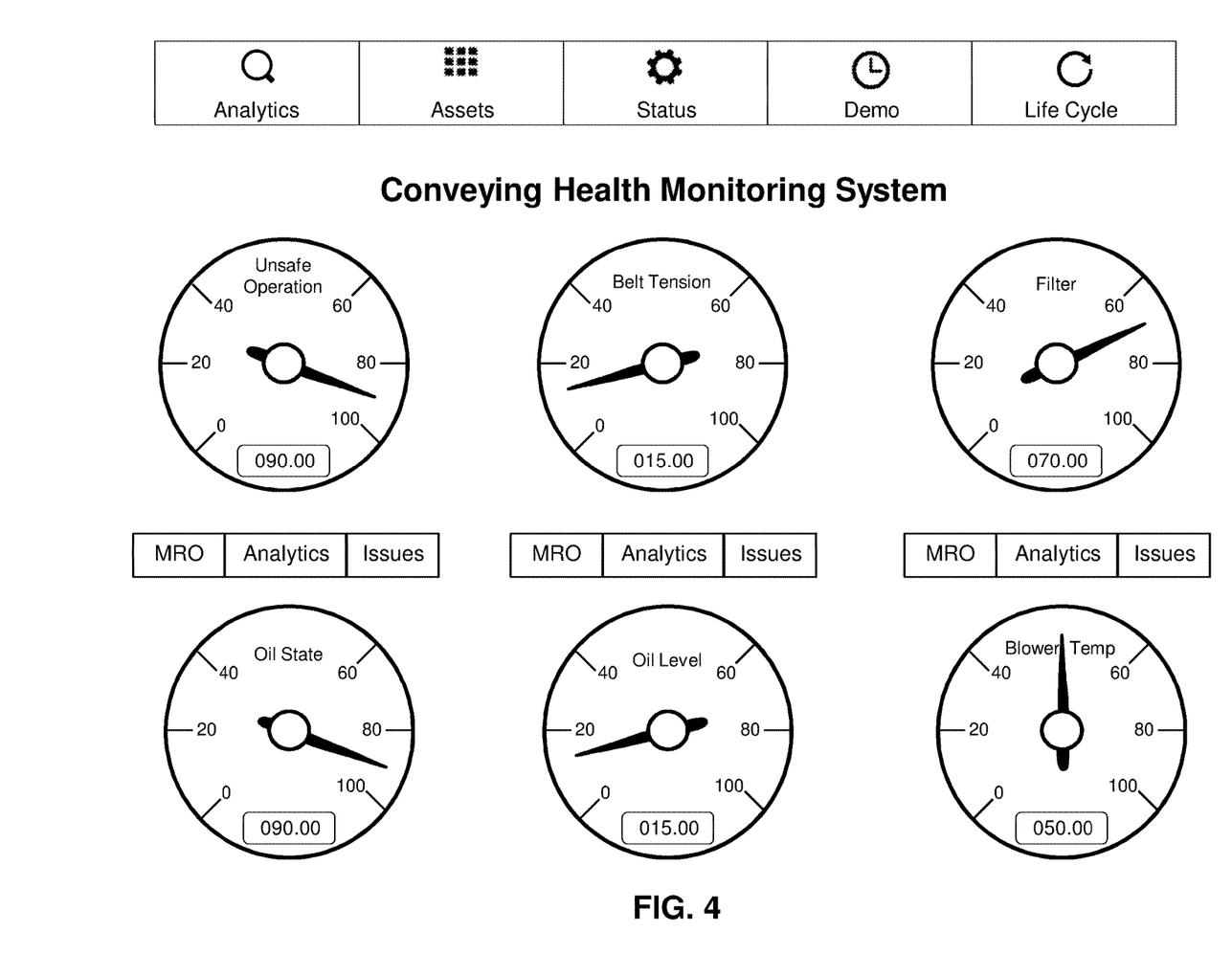
FIG. 4 is a diagrammatic representation of a fuel gauge to depict a predictive maintenance state, according to one example embodiment.

In an example embodiment, the depiction on a user interface may be a fuel gauge type representation as shown in FIG. 4 conveying health monitoring system.

In one or more embodiments, the fuel gauge may be associated with color schemes such as red, yellow and green. In the fuel gauge color scheme, red may indicate a worst maintenance condition, yellow may indicate an intermediate condition, and green may indicate a best maintenance condition.

In one or more embodiments, an alarm may be raised when the color scheme is one of a yellow and a red.

In one or more embodiments, the sensor data is one or more of a vibration, magnetic field, power factor and a temperature.

In one or more embodiments, a mobile middleware is one of a mobile application, a web application and a desktop application. The mobile middleware may calibrate and base-line the sensor data.

In one or more embodiments, base-lining may include adding a data set automatically by running a good machine. Further, a good machine may be a machine in an ideal state. The ideal state may be a perception of a user of a machine. In predictive maintenance, the basic objective is to find a difference between the good machine and a bad machine. In older machines, the good machine may be a machine that the user perceives as good. The good machine may not have a new machine condition. Hence base-lining allows to take data from machines in a learning mode to archive it as "data set" which is referenced as "good machine condition", which is further used to study deviation for bad machines.

In one or more embodiments, base-lining may be of different types including manual and automatic. In manual base-lining, a user may select any machine state and attribute the selected machine state as a good baseline. In automatic base-lining, a factory default machine data may be used as a reference and once the user runs auto-baseline, a machine learning engine may adjust a factory base-line level automatically.

In an example embodiment, multiple sensor data from multiple locations may be received over a communications network 102 onto a mobile application 108 coupled to a mobile device. An alarm may be raised over the communications network 102 through one of a notification on the mobile application, Short message service (SMS), email, or a combination thereof.

Figure 2:
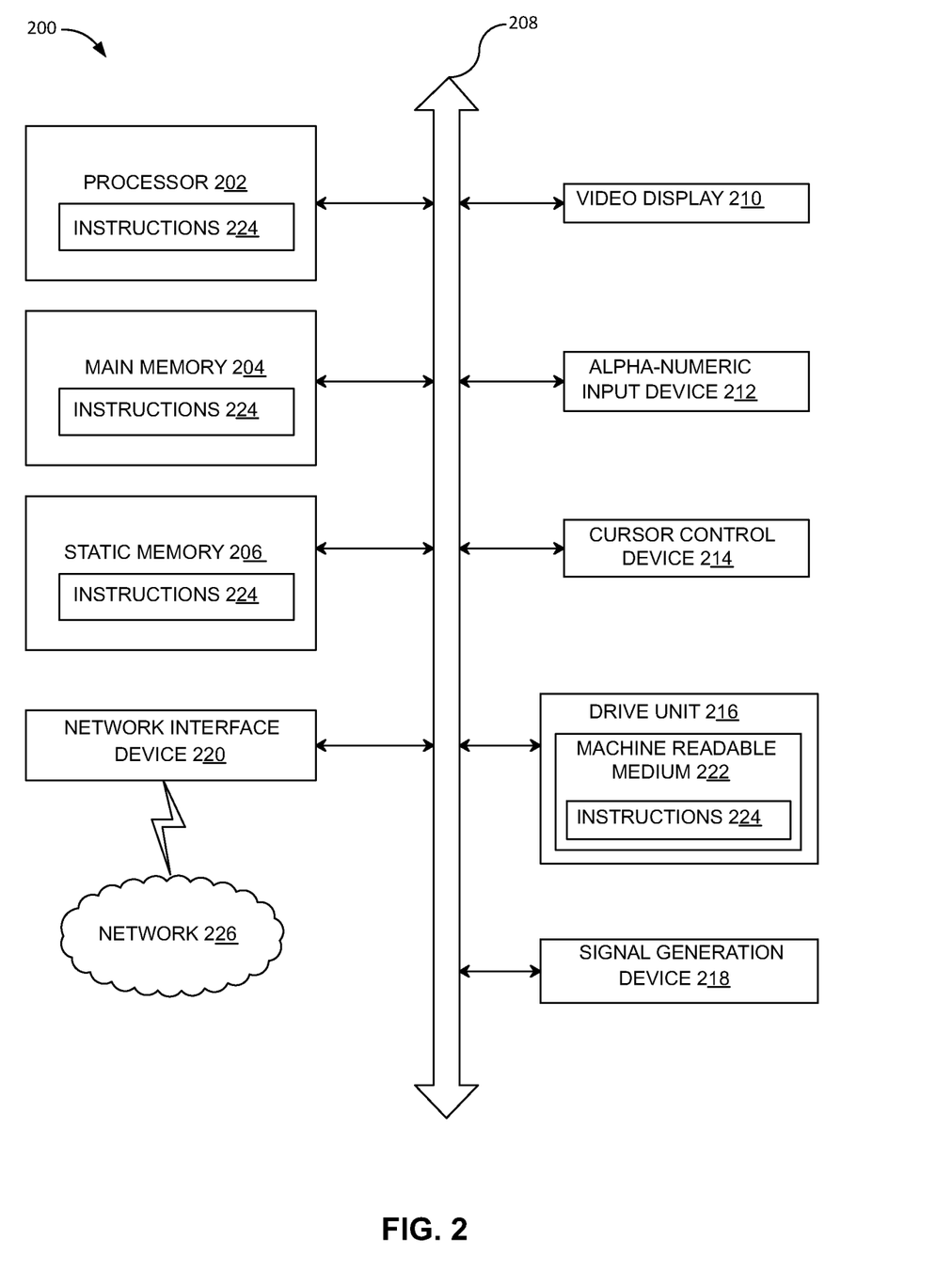
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in an exemplary form of a computer system 200 within which a set of instructions, for causing the machine to perform one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 200 includes a processor 202 (e.g., a central processing unit (CPU), a graphics processing unit (GPU), and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 3:
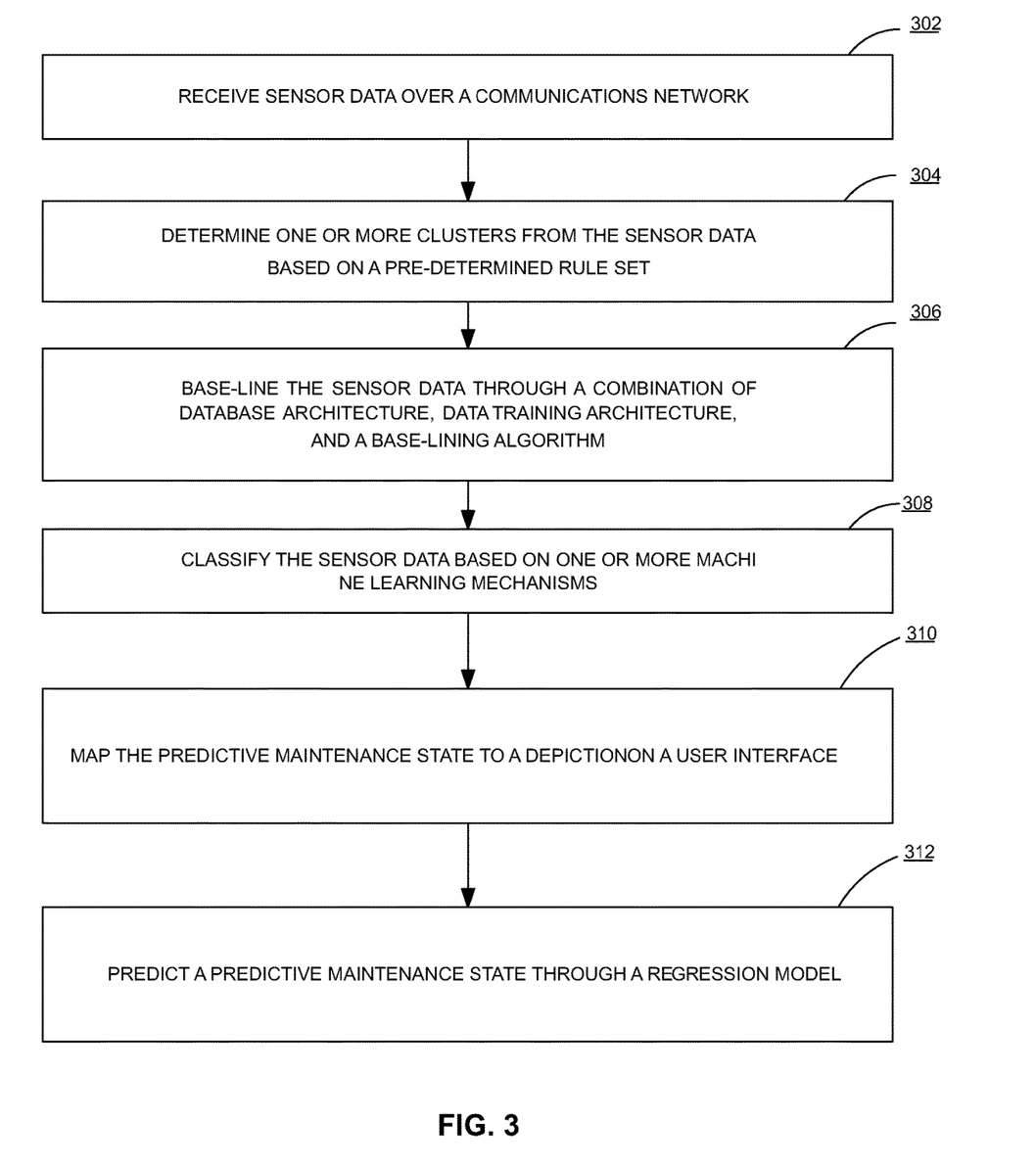
FIG. 3 is a process flow diagram detailing the operations of a method of a predictive maintenance IoT system, according to one or more embodiments.

FIG. 3 is a process flow diagram detailing the operations of a method of a predictive maintenance through an IoT system, according to one or more embodiments. A method of a predictive maintenance through an IoT system may comprise the steps of: receiving a plurality of sensor data over a communications network, as shown in step 302 and determining one or more clusters from the sensor data based on a pre-determined rule set, as shown in step 304. Further, the sensor data may be base-lined through a combination of database architecture, data training architecture, and a baselining algorithm, as shown in step 306. Further, the sensor data may be classified through a machine learning engine, as shown in step 308. The intensity of fault state is mapped to a depiction on a user interface, as shown in step 310 and the predictive maintenance state is predicted through a regression model, as shown in step 312.

Figure 5:
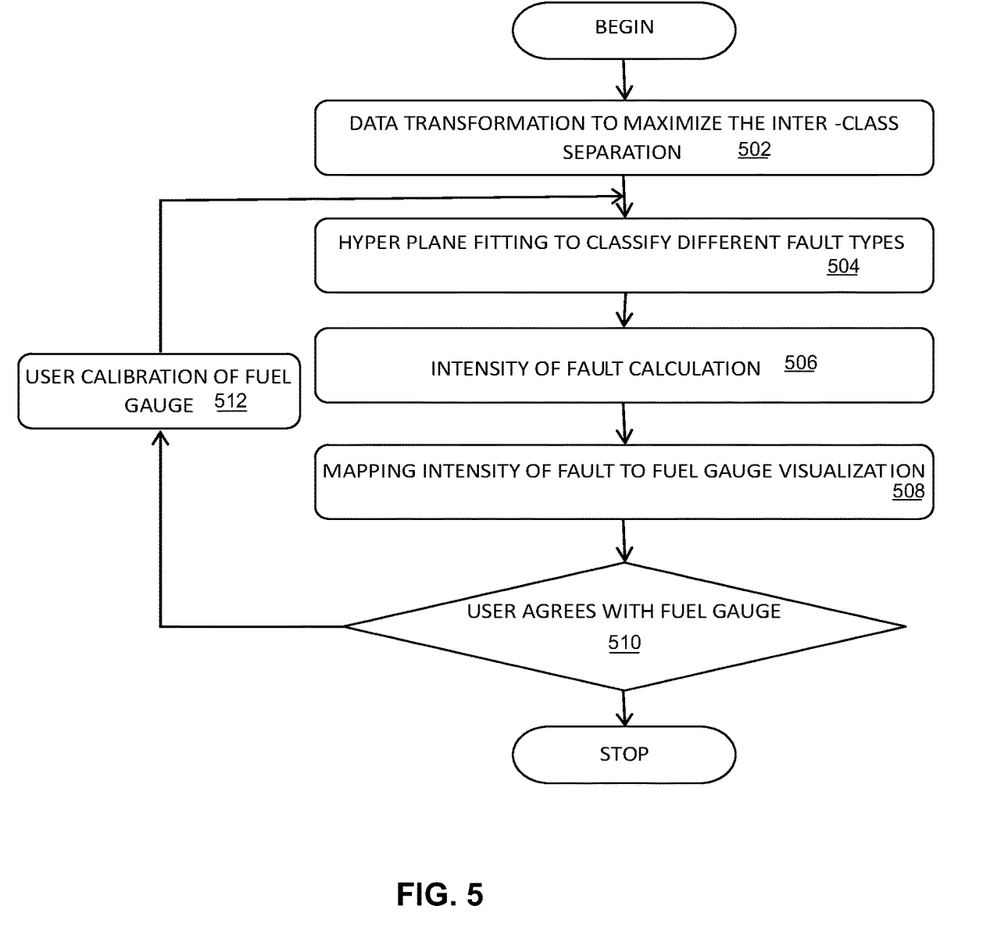
FIG. 5 is a flow diagram representing a multi-classification, according to one embodiment.

FIG. 5 is flow diagram detailing the steps of a multi-classification, according to one embodiment. In one or more embodiments, steps of multi-classification may include data transformation to achieve maximum separation among fault types, as shown in step 502. Data transformation may lead to more accurate multi classification e.g. linear discriminant functions. Further, nonlinear hyper plane fitting may be done to classify different fault types, as shown in step 504, e.g. quadratic hyper planes in transformed variable space. Developing a measure to represent the degree of fault based on machine learning multi-fault classification approach. The intensity of fault may be calculated, as shown in step 506, e.g. posterior probability of fault type. The degree of fault information may be mapped to the fuel gauge, as shown in step 508, e.g. combining different fault type posterior probabilities to get fuel gauge representation. User calibration of the fuel gauge, as shown in step 512 to include user intuition about the machine state into the analytics process. The multi classification may end when the user agrees with the fuel gauge, as shown in step 510.

In an example embodiment, a predictive maintenance IoT system may include machine wearable sensors. Further, the system may be used for overseeing process control and predictive maintenance of a machine or a network of machines. The system may include a plurality of machine-wearable sensors, each of which may be secured to the exterior of the machine. Each sensor is capable of transmitting captured data wirelessly over a communications network. The system may further include a sensor network for receiving and transmitting the captured data over a communications network and a machine learning algorithm engine capable of receiving data from the sensor network. The machine learning algorithm engine may process the received data to recognize one of a pattern and a deviation, to issue control commands pertaining to the machine. Lastly, the system may include one or more control modules disposed in operative communication with a control panel of the machine, the control module is capable of receiving, over a communications network, one or more control commands and executing the control commands.

In an example embodiment, the machine learning engine 104 may raise an alarm when one of a filter is clogged and deficient oil is detected. The deficient oil may be one of a low oil level and an overused oil structure. The system may be associated with a plurality of machine wearable sensors. The machine learning engine 104 associated with the system, may issue commands based on a learning outcome from an analysis through a combination of physics based model, a rule based model and a vector classifier model of the sensor data.

In one or more embodiments, the learning outcome may be dependent on recognition of one of a pattern and deviation recognized by the machine learning engine.

In one or more embodiments, the predictive maintenance IoT system may detect multiple component or organ failure of a machine before the failure happens.

In an example embodiment, temperature, vibration, power factor and magnetic field data may be used for classification of a machine state such as a bad oil level and/or low oil level. Bad oil level may increase the friction and thereby raise the surface temperature of a machine component.

In one or more embodiments, a machine learning based classification may include a physics based classification, a vector based classification, and a rule based classification. Vector based classification may be based on an oblique and/or support vector machine. Support vector machines may comprise supervised learning models with associated learning algorithms that analyze data and recognize patterns. The supervised learning models may be used for classification and regression analysis.

In an example embodiment, a component such as blower may be associated with machine wearable sensors. The machine wearable sensors may measure multiple factors such as magnetic field, surface temperature, and angular displacement.

In one or more embodiments, similar data patterns may be found for multiple classes. A similar feature extraction may indicate multiple root cause. For example higher RMS (Root mean square) value of vibration may indicate multiple issues such as old oil, high oil level, bearing failure etc.

In one or more embodiments, failure pattern data may be same as some extreme process driven data. A process may generate a data that may look like a failure data. Failure signs and/or failure pattern data for different process conditions may be different.

In one or more embodiments, a multi-stage multi-classification of IoT data for predictive maintenance of a machine may include: a rule based process classification; building clusters of sensor data based on models such as physics based models; applying a multi-class classification to classify a sensor data into various classes (such as bad oil, ove1fill oil etc., for vacuum pump); discovering a root cause for a fault; and classifying the sensor data into a predictive maintenance state such as a red, yellow and green. Further, the classified sensor data may be mapped onto a simple depiction such as a fuel gauge representation so that maintenance personnel may easily understand the classification.

In one or more embodiments, a regression analysis may be a statistical process for estimating a relationship amongst variables. A regression algorithm may include fitting of a function f(x, y, z) based on a scattered diagram of x, y, z, f etc. Storing regression fitting parameters from a training data set may be considered as simple machine learning algorithm.

In one or more embodiments, Principal component analysis (PCA) may be a statistical procedure that uses an orthogonal transformation to convert a set of observations of possibly unrelated variables into a set of values of linearly uncorrelated variables called principal components. The number of principal components selected for further analysis may be less than and/or equal to the number of original variables. Projections may be made onto a principal component subspace for a training data. Based on the projections, classifications of hyper places may be made from the training data.

In an example embodiment, data may be collected from diverse locations such as 10,000 factory locations for 3P (prescriptive, preventative and predictive) maintenance by using a combination of Cassandra (distributed database), Stolm and/or Spark real time to process the data in a real time Big Data architecture and implemented using a broker system such as Kafka for storing the alarms as buffer database and then using Storm and/or Cassandra like distributed database for an MRO (maintenance, repair and operation) system.

In one or more embodiments, a prescriptive, preventative and predictive maintenance may be a possibility for a machine. Big data methodologies may be employed to analyze data obtained from various locations through an IOT sensor network. Big data may be used to describe a massive volume of both structured and unstructured data. Large volumes of data may be difficult to process using a traditional database and traditional software techniques. Therefore, a distributed real-time computation system such as Apache Storm may be used.

In an example embodiment, a real time data processing system may be associated with distributed databases. The real time data processing system may be a big data system.

FIG. 4 is an exemplary representation of a fuel gauge depicting a predictive maintenance state, according to one embodiment.

In an example embodiment, machines may run to failure very often due to abusive operation coupled with poor maintenance. Machines associated with machine wearable sensors may report one or more sensor data such as temperature, vibration, pressure and sound. These data may be used by a platform to check against a baseline database and the platform offers early warning for machine failure and/or real time alarm for faulty operation. From machine learning algorithms of data, the platform sends out early indication of machine failure and/or requirement of maintenance for the machine.

In an example embodiment, machine learning of the vibrational data may comprise transfer of vibrational energy from one axis of rotation to other axis in order to determine an extent of oldness of the oil, which is used in the blower bearings to achieve smooth rotation. Machine learning of the vibrational data may comprise of information related to instability and wobbling of rigid rotational axis to determine an extent of oldness of oil used in bearings of the blower.

In one or more embodiments, on field calibration of a fuel gauge representation may be present, such that a maintenance personal and/or user can set his/her own scale for setting up alarm system and color scheme.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that various operations, processes and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto a retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method of pneumatically conveying particulate material while providing a user visible IoT-based classification and predictive maintenance reading respecting performance of the method comprising:
   a) providing a vacuum pump comprising:
      i. a motor;
      ii. a blower; and
      iii. a plurality sensors for measuring vibration, magnetic field, pressure and temperature at various positions on the vacuum pump;
   b) by operation of the vacuum pump, drawing a vacuum though a conduit leading from the vacuum pump to a material receiver and on to a particulate material pickup device thereby picking up and transporting particulate material from a source thereof to the receiver;
   c) providing data from the sensors to a communications network;
   d) receiving in mobile middleware a plurality of sensor data from the communications network;
   e) determining one or more clusters from the sensor data based on a pre-determined rule set;
   f) classifying the sensor data from the sensors through a machine learning engine connected to the middleware;
   g) base-lining the sensor data, in a real time data processing system communicating with the machine learning engine, using a combination of database architecture, data training architecture, and a base-lining algorithm;
   h) using a regression model calculating the predictive maintenance state of the vacuum pump; and
   i) presenting the maintenance state of the method on a fuel gauge representation based on a predictive maintenance state calculated by the regression model.

2. The method of claim 1, wherein the machine learning engine is associated with at least one of a physics based model, a rule based model and a vector classifier model.

3. The method of claim 1, wherein the data training architecture receives as input, a baseline reading and anomalous reading for a component with one or more of the sensors attached.

4. The method of claim 1, wherein the calculated predictive maintenance state is displayed on a fuel gauge in a color scheme in which red indicates a worst maintenance condition, yellow indicates an intermediate condition, and green indicates a best maintenance condition.

5. The method of claim 4, further comprising setting a user defined alarm system based on a field calibration of the fuel gauge representation.

6. The method of claim 1 further comprising raising an alarm when a color representing the calculated predictive maintenance state is at least one of yellow and red.

7. The method of claim 6, wherein the mobile middleware is a mobile application, a web application, or a desktop application, and the mobile middleware calibrates and base-lines the sensor data.

8. The method of claim 7, wherein the alarm is raised over the communications network through notification on the mobile application via short message service, email, or a combination thereof.

9. Apparatus for pneumatically conveying particulate material including a user visible IoT-based classification and predictive maintenance system noting apparatus maintenance state, comprising:
   a) a vacuum pump comprising:
      i) a motor;
      ii) a blower; and
      iii) a plurality of sensors mounted on the pump for measuring vibration, magnetic field, pressure, power factor, and temperature, and supplying data indicative of such measurements;
   b) a real time data processing system comprising:
      i) a machine learning engine for classifying the sensor data according to a predetermined rule set;
      ii) a base-lining architecture for base-lining the sensor data, the base-lining architecture comprising:
         (1) a combination of database architecture, data training architecture, and a base-lining algorithm; and
         (2) a regression module associated with a processor to predict a predictive maintenance state;
   c) a receiver for storage of conveyed material received pneumatically from the pick-up device;
   d) tubular segments for pneumatically connecting the receiver to the vacuum pump and for pneumatically connecting the pickup device to the receiver for pneumatic conveyance of the particulate material from the pickup device to the receiver through the tubing in response to vacuum drawn by the pump;
   e) a user interface, connected to the pump, for visibly displaying the determined state of maintenance of the pneumatic conveying apparatus
   f) the real-time data processing system mapping the predicted maintenance state of the pneumatic conveying apparatus as a depiction on the user interface.

10. The apparatus of claim 9, wherein the machine learning engine is associated with at least one of a physics based model, a rule based model and a vector classifier model.

11. The apparatus of claim 9, wherein the data training architecture receives as input a baseline reading and anomalous reading from a component associated with at least one of the sensors.

12. The apparatus of claim 10, wherein the display on the user interface is a fuel gauge, associated with a color scheme in which red indicates a worst maintenance condition, yellow indicates an intermediate condition, and green indicates a best maintenance condition.

13. The apparatus of claim 9, wherein the real time data processing system raises an alarm when a color depicted on the user interface is at least one of yellow and red.

14. The apparatus of claim 13, further comprising mobile middleware for receiving the sensor data; wherein: the mobile middleware is at least one of a mobile application, a web application, and a desktop application.

15. The apparatus of claim 14, wherein the mobile middleware calibrates and base-lines the sensor data.

16. The apparatus of claim 13, wherein the alarm is raised on the communications network through notification on the mobile application via short message service, email, or a combination thereof.

17. Material transport apparatus comprising:
   a) means for moving material from a source to a terminus;
   b) means for sensing and measuring physical parameters and providing signals indicative of the measured parameter values to the internet;
   c) the sensing and measuring means being operatively connected to the moving means, the source and the terminus for sensing and measuring physical parameters thereof;
   d) means for collecting the signals from the internet;
   e) electronic computing means connected to the internet and receiving the signals therefrom and performing data analysis providing estimated relationships among the measured physical parameters, segregating the data, performing orthogonal transformation thereon to provide linearly uncorrelated variables as principal components, constructing training data from selected principal components, forming hyperplanes from other principal components and drawing predictive maintenance states for the apparatus from the hyperplanes; and
   f) gauge means for visibly displaying the drawn predictive maintenance states for the apparatus.

18. The apparatus of claim 17, wherein the gauge means comprises a fuel gauge representation based on the predictive maintenance state.

19. The apparatus of claim 18, wherein the fuel gauge is associated with a color scheme in which red indicates a worst maintenance condition, yellow indicates an intermediate condition, and green indicates a best maintenance condition.

20. The apparatus of claim 19, further comprising alarm means for raising an alarm when the color on the fuel gauge is at least one of yellow and red.

* * * * *